Sept. 16, 1941. A. Y. DODGE 2,255,762
CONSTANT VELOCITY UNIVERSAL JOINT
Filed Oct. 31, 1938

*INVENTOR*
*ADIEL Y. DODGE*
*ATTORNEYS*

UNITED STATES PATENT OFFICE 2,255,762

CONSTANT VELOCITY UNIVERSAL JOINT

Adiel Y. Dodge, Rockford, Ill.

Application October 31, 1938, Serial No. 237,863

10 Claims. (Cl. 64—21)

This invention relates to universal joints of the constant velocity type.

The principal object of my invention is to provide a universal joint having the following features and characteristics:

1. Capacity for transmitting constant angular velocity;
2. Rugged construction throughout;
3. Low friction resistance to any and all movements;
4. Simple to fabricate;
5. Small in size, but affording a large range of change in angularity between the driving and driven shafts, and
6. Self-supporting in that it does not require bearings close to the driving and driven ends of the joint, and self-contained or self-enclosing in that it requires no separate outer cover or housing.

A salient feature of the universal joint of my invention is that it embodies three sets of knuckle joints with their axes disposed 90° apart and spaced with respect to one another along the coincident or intersecting longitudinal axes of the driving and driven shafts, the said joint embodying means for causing the shaft axes to intersect always at a central point in the plane of the axis of the intermediate knuckle joint that bisects the angle between the driving and driven shafts.

Another noteworthy feature of the present universal joint is the provision of heavy bearings for the knuckle joints at the two ends of the joint arranged to come into engagement to limit angular displacement between the driving and driven shafts, and avoid having any destructive strains put upon the centering means.

I am aware that some of the objects of my invention have been attained to one degree or another by others, but no other universal joint to my knowledge has embodied all of the desirable features of this invention.

Other objects and advantages of the invention will appear in the course of the following description in which reference is made to the accompanying drawing, wherein—

The same reference numerals are applied to corresponding parts throughout the views.

Figure 4:
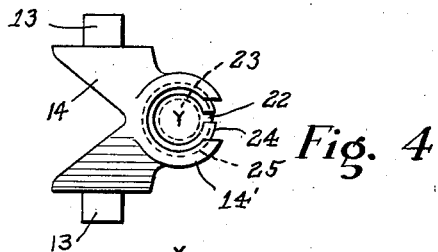
Fig. 4 is an isolated view of one of the yokes of the joint shown in Figs. 1 to 3.
Figure 3:
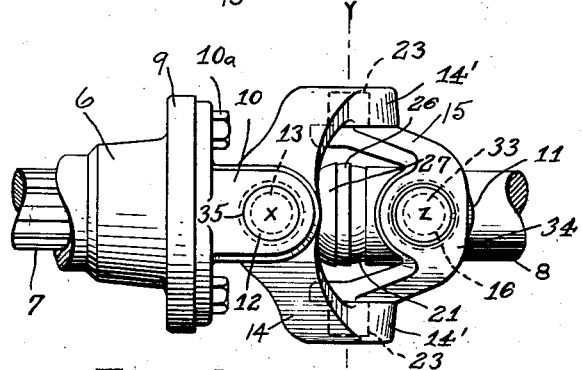
Fig. 3 is a plan view of Fig. 1.

Referring first to Figs. 1 to 4, attention is directed to the three axes labeled $x$—$x$, $y$—$y$ and $z$—$z$, each of which is in a separate plane spaced from the planes of the other axes along the coincident or intersecting axes of the driving and driven shafts 7 and 8. The sleeve 6 may be splined to the driving shaft 7, and the driven shaft 8 may also be splined. However, it will be understood that either of these shafts 7 and 8 may be the driving shaft and the other the driven shaft. 9 is a disk or yoke member preferably integral with the sleeve 6 and having bearing caps 10 suitably secured thereto as by means of screws 10a. 11 is a yoke member or cross-head preferably formed integral with the shaft 8. The axis $x$—$x$ is defined by the thimble-like bearing races 12 in the caps 10 receiving two diametrically opposed trunnions 13 preferably formed integral with the yoke member 14. The latter is ring-shaped and carries, in addition to the diametrically opposed trunnions 13, open-sided C-type bearing bosses 14' on diametrically opposite sides thereof displaced 90° with respect to the trunnions 13 and in a plane spaced from the plane of the trunnions 13. These bosses 14' receive thimble-like bearing races 22 in which trunnions 23 defining the axis $y$—$y$ find bearing support. The trunnions 23 are integral with another ring-shaped yoke 15. These C-type bearing bosses permit the trunnions 23 to be entered through the open sides of the bearing bosses after which the thimble-like bearing cups 22 are applied to the trunnions, and split washers 24 are entered in annular grooves 25 to keep the parts in assembled relation. In the case of the axis $z$—$z$, a through pin 16 passed through the cross-head or yoke 11 provides the trunnions 33 which define the axis $z$—$z$, and this pin may be entered prior to installing the last thimble-like bearing races 12a. The races 12 and 12a may be retained in place by means of snap rings. I prefer to provide machined shoulders in the bearing caps 10, as indicated at 35, and use snap rings in the bearing bosses 34, as indicated at 36. From this much description it must appear that the angular variation between the axes $x$—$x$ and $y$—$y$ in the rotation of the joint is neutralized by the complementary angular variation between the axes $y$—$y$ and $z$—$z$ with the result that there is no angular variation involved in the transmission of drive from one of the shafts 7 and 8 to the other. In other words, the present construction obtains constant velocity drive, in keeping with the fact as previously stated that the present joint is of the constant velocity type.

Figure 1:
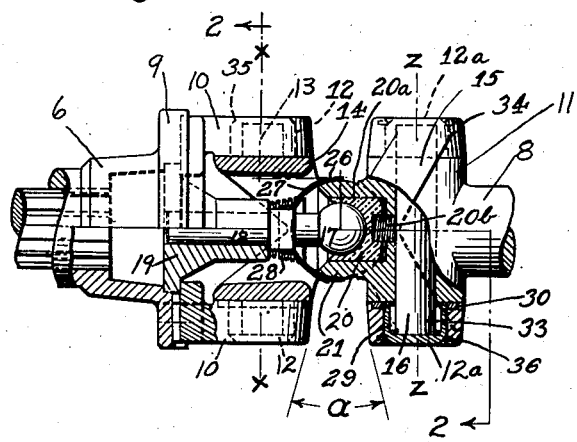
Fig. 1 is a view partly in side elevation and partly in longitudinal section of a universal joint embodying my invention.
Figure 2:
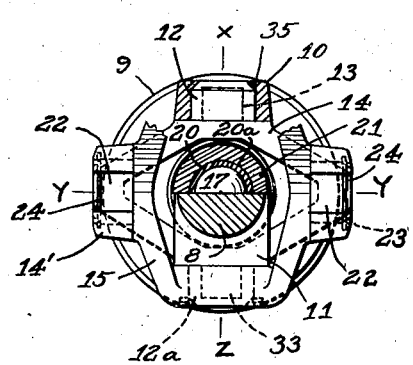
Fig. 2 is a cross-section on the broken line 2—2 of Fig. 1.

A ball head 17 is illustrated in Fig. 1 carried on a stem 18 pressed into a bracket 19 that is secured to the disk or yoke member 9 by the bearing caps 10. The ball head 17 has a swivel fit in a cylindrical socket member 20 received with a close working fit in a hole 20a provided therefor in a spherical boss 21 provided on the cross-head 11. A coiled compression spring acting between the cross-pin 16 and the socket member 20 tends normally to urge the latter toward the ball head 17. This ball and socket joint 17—20 has two functions: First, it causes the axes of the driving and driven shafts 7 and 8 to intersect always at one point, namely, at the center of the ball head 17, and, second, it controls the relationship of the offset axes $x$—$x$, $y$—$y$ and $z$—$z$ in relation to the center-lines or axes of the two shafts 7 and 8 so that the axis $y$—$y$ always bisects the angle between said shafts. In other words, the plane of revolution of the axis $y$—$y$ bisects the angle of revolution of the axis $x$—$x$ and $z$—$z$ at all times. At 26 and 27 are indicated two sheet metal stampings which cooperate with the spherical exterior of the boss 21 to keep the ball and socket joint enclosed, and 28 is a coiled compression spring acting between the bracket 19 and these sheet metal stampings to hold them in place. In passing, it will also be noted that the bearing cups 12, 22 and 12a all contain needle-like roller bearings 29, and that the bearing caps 10 and bearing bosses 34 are provided with grease retaining washers 30 to seal the bearing cups against loss of lubricant and ingress of dirt and grit.

It will be seen from this description that I have provided a constant velocity joint of simple and practical construction, all of whose details have stood the tests of experience in joints of other designs. The present joint is no larger in diameter nor much longer in its over-all dimension than the conventional variable velocity joints which it may replace. Furthermore, this constant velocity joint has the ruggedness found usually only in variable velocity joint constructions, and the present joint is one which by reason of its centering means 17—20 will support one of the shafts when the other is supported. The present joint is also of advantage because it confines its lubricant in its bearings and conventional methods of lubrication are applicable. The angle $a$ indicated in Fig. 1 is the maximum angle through which one of the shafts 7 and 8 may be displaced with respect to the other, and it is evident that the rugged outer members of the joint such as the bearing caps 10 and bearing bosses 34 will engage to limit the angular displacement, thus protecting the smaller inner members of the joint such as the ball head 17 and socket 20, which have been constructed so as to have capacity for greater angular displacement with respect to one another so that they will not limit the angular displacement of the shafts relative to one another. In the other plane the yoke 15 strikes the projecting boss portion 21 of the yoke 11, and the yoke 14 strikes the yoke member 9 to limit angular displacement between the shafts 7 and 8 and thereby protect the smaller inner parts of the joint against excessive loading.

In operation, assuming that the shaft 7 is the driving shaft and 8 is the driven shaft, torque is delivered to the sleeve 6 and thence to bearing caps 10 to transmit drive to the yoke 14 through the trunnions 13. The yoke 14 transmits torque to the trunnions 23 on the yoke 15, and the latter in turn transmits torque to the trunnions 33 on the yoke 11 turning with the driven shaft 8. The shaft 8 may be moved to any angle with relation to the shaft 7 within the range of the angle $a$, the misalignment being taken up in the axes $x$—$x$, $y$—$y$ and $z$—$z$ in different amounts, but in the correct amounts to produce the same instantaneous angular velocity in the shaft 8 as exists in the shaft 7 at all times.

It is believed the foregoing description conveys a good understanding of the objects and advantages of my invention. The appended claims have been drawn with a view to covering all legitimate modifications and adaptations.

I claim:

1. In a universal joint structure, the combination of a pair of yoke assemblies, one comprising a terminal yoke member pivotally connected on a transverse axis with an intermediate ring-shaped yoke member, and the other yoke assembly comprising a companion intermediate ring-shaped yoke member pivotally connected to the first-named ring-shaped yoke member on a transverse axis at right angles to and spaced forwardly from the aforesaid transverse axis, and a second terminal yoke member on the opposite side of said second ring-shaped yoke member from the first ring-shaped yoke member and adapted to be pivotally connected therewith on a transverse axis in a plane parallel to the first-named transverse axis and spaced from the second-named axis on the opposite side from the first axis, said second-named ring-shaped yoke member having diametrically opposed coaxial trunnions on said third transverse axis, bearing blocks pivotally engaging said trunnions, means for detachably securing said bearing blocks to the second terminal yoke, and centering means for said yoke assemblies comprising a socket member projecting axially from the first terminal yoke toward the second terminal yoke, and a ball-headed member projecting axially from the second terminal yoke toward the first terminal yoke and having the ball head thereof fitting in the socket of the socket member, the ball-head member having an attaching portion abutting the second terminal yoke and detachably secured in place thereon by the bearing blocks.

2. In a universal joint structure, the combination of a pair of yoke assemblies, one comprising a terminal yoke member pivotally connected on a transverse axis with an intermediate ring-shaped yoke member, and the other yoke assembly comprising a companion intermediate ring-shaped yoke member pivotally connected to the first-named ring-shaped yoke member on a transverse axis at right angles to and spaced forwardly from the aforesaid transverse axis, and a second terminal yoke member on the opposite side of said second ring-shaped yoke member from the first ring-shaped yoke member and adapted to be pivotally connected therewith on a transverse axis in a plane parallel to the first-named transverse axis and spaced from the second-named axis on the opposite side from the first axis, said second-named ring-shaped yoke member having diametrically opposed coaxial trunnions on said third transverse axis, bearing blocks pivotally engaging said trunnions, means for detachably securing said bearing blocks to the second terminal yoke, and centering means for the yoke assemblies comprising interfitting ball and socket members swiveled so that the second axis passes through the center of the ball, one of said ball and socket members comprising an integral axial extension on the first terminal yoke and the other of said ball and socket members having an attaching portion detachably engaging the second terminal yoke and held in place thereon by said bearing blocks.

3. In a universal joint structure, the combination of a pair of yoke assemblies, one comprising a terminal yoke and a ring-shaped intermediate yoke member pivotally connected thereto on a transverse axis, the other yoke assembly comprising a second ring-shaped intermediate yoke member pivotally connected with the first-named ring-shaped yoke member on a transverse axis at right angles to and spaced from the first-named transverse axis, and a second terminal yoke adapted to be pivotally connected with the second ring-shaped yoke member on a transverse axis in a plane parallel to the first transverse axis but spaced from the second axis on the opposite side from the first axis, said second terminal yoke being T-shaped and having a hollow cross-portion fitting diametrically within the second ring-shaped yoke member, said second ring-shaped yoke member having coaxial diametrically opposed bearing bosses in concentric relation with the bore of said cross-portion, a pin entered through the bore subsequent to positioning of said cross-portion in the second ring-shaped yoke member, the opposite ends of said pin projecting into said bosses to provide trunnion portions, lubricant retaining thimble-like bearing members assembled in said bosses over said trunnion portions to pivotally connect the second ring-shaped yoke member with the second terminal yoke, a spherical projection on the cross-portion of said last-named terminal yoke having a cylindrical bore coaxial with said terminal yoke, a cylindrical bearing block slidable in said bore and having a spherical socket therein, a ball-headed member carried on the first-mentioned terminal yoke coaxial therewith and having the ball head thereof swiveled in said socket with its center coincident with the second-named axis, spring means urging the bearing block toward the ball head, and a spherical cover carried on the ball headed member and slidably engaging the outside of the spherical projection.

4. A universal joint structure as set forth in claim 3, including spring means urging the spherical cover toward the spherical projection.

5. In a universal joint structure, the combination of a pair of yoke assemblies each comprising a terminal yoke and an intermediate ring-shaped yoke member pivotally connected therewith on a diametrical axis, said diametrical axes being in spaced relation in parallel planes, means pivotally interconnecting the ring-shaped yoke members on a third diametrical axis in a plane at right angles to the plane of the first-named axes and spaced midway between said axes, bearing means for maintaining said yoke assemblies in centered relation about a point coincident with the last-named axis and comprising a spherical projection on one of said terminal yokes having a cylindrical bore provided therein on the axis of rotation of said yoke, a cylindrical bearing block slidable in said bore and having a spherical socket provided therein centrally thereof, and a ball-headed member on the other of said terminal yokes on the axis of rotation thereof and having the ball head swiveled in said spherical socket, spring means acting between the cylindrical bearing block and the associated terminal yoke member to urge said block toward the ball head, and a spherical cover for said spherical projection swiveled on said projection and slidable longitudinally on the ball-headed member.

6. A universal joint structure as set forth in claim 5, including spring means acting between the spherical cover and the other terminal yoke to urge the spherical cover toward the spherical projection.

7. In a universal joint structure, the combination of a pair of yoke assemblies each comprising a terminal yoke and a ring-shaped yoke member pivotally connected thereto on a diametrical axis, one of said ring-shaped yoke members fitting within the other ring-shaped yoke member and pivotally connected thereto on a diametrical axis in a plane 90° from the first-mentioned diametrical axes and spaced midway therebetween, one of said terminal yokes being T-shaped and being pivotally connected to the adjacent ring-shaped yoke member by a cross-pin extending through the cross-portion of the T thereof, the other of said terminal yokes being U-shaped with at least one branch of the U detachable and the adjacent ring-shaped yoke member having diametrically opposed trunnions received in bearings provided therefor in the two branches of the U, and a centering joint for maintaining centered relationship of one yoke assembly relative to the other about a point coincident with the axis of pivotal connection between the two ring-shaped yoke members, said joint comprising an axial projection on the T-shaped terminal yoke member and an axial projection on the U-shaped terminal yoke member, one of said projections having a ball head thereon and the other of said projections having a socket provided therein wherein the ball head is swiveled.

8. In a three-axis constant velocity joint including means defining a first axis including a driving yoke, means defining a second axis 90° from said first axis and means defining a third axis 90° from said second axis including a driven yoke, and means defining a pilot assembly connecting said driving and driven yokes comprising an inwardly extending protuberance formed on one of said yokes, said protuberance having an axially extending cylindrical interior wall opening in the direction of the opposed yoke, a cylindrical member reciprocable in said cylindrical interior wall, said cylindrical member being interiorly formed with a spherical socket likewise opening in the direction of the opposed yoke, a second protuberance extending axially from said opposed yoke member and comprising a ball on the end thereof received in said spherical socket in surface contact therewith, spring means interposed between said cylinder and said supporting yoke, said cylinder being effective to swivel about said ball and move axially relative to said surrounding cylindrical wall when said driving yoke and said driven yoke are moved angularly relative to one another, said first named protuberance being formed with a spherical exterior, a spherical shaped housing embracing the spherical exterior of said protuberance within one portion thereof and having a second portion embracingly received about said second protuberance, and spring means effective to cause said housing to move relative to said second named protuberance maintaining the same in embracing relation with the spherical exterior surface of said first named protuberance.

9. In a three-axis constant velocity joint including means defining a first axis including a driving yoke, means defining a second axis 90° from said first axis and means defining a third axis 90° from second axis including a driven yoke, and means defining a pilot assembly connecting said driving and driven yokes comprising an inwardly extending protuberance formed on one of said yokes, said protuberance having an axially extending cylindrical interior wall opening in the direction of the opposed yoke, a cylindrical member reciprocable in said cylindrical interior wall, said cylindrical member being interiorly formed with a spherical socket likewise opening in the direction of the opposed yoke, a second protuberance extending axially from said opposed yoke member and comprising a ball on the end thereof received in said spherical socket in surface contact therewith, spring means interposed between said cylinder and said supporting yoke, said cylinder being effective to swivel about said ball and move axially relative to said surrounding cylindrical wall when said driving yoke and said driven yoke are moved angularly relative to one another, said first named protuberance being formed with a spherical exterior, a spherical shaped housing embracing the spherical exterior of said protuberance within one portion thereof and having a second portion embracingly received about said second protuberance, and spring means effective to cause said housing to move relative to said second named protuberance maintaining the same in embracing relation with the spherical exterior surface of said first named protuberance, the spherical sheet metal housing being formed in two telescoping concentric sections thus providing for increased angularity of adjustment.

10. In a universal joint structure, the combination of a pair of yoke assemblies each comprising a terminal yoke and a ring-shaped yoke member pivotally connected thereto on a diametrical axis, one of said ring-shaped yoke members fitting within the other ring-shaped yoke member and pivotally connected thereto on a diametrical axis in a plane 90° from the first-mentioned diametrical axes and spaced midway therebetween, one of said terminal yokes being T-shaped and adapted to be pivotally connected to the adjacent ring-shaped yoke member by a cross-pin extending through the cross-portion of the T thereof, the opposite ends of said pin projecting into openings provided in said ring-shaped yoke member to provide trunnion portions, lubricant retaining thimble-like bearing members secured in said openings over said trunnion portions to pivotally connect the yoke members and retain the cross-pin against endwise displacement, the other ring-shaped yoke member having diametrically opposed outwardly extending coaxial trunnions, lubricant retaining thimble-like bearing members pivotally engaged over said trunnions, means for detachably securing said bearing members to the other terminal yoke, and centering means for the yoke assemblies comprising interfitting ball and socket members swiveled so that the middle axis passes through the center of the ball, one of said ball and socket members comprising an integral axial extension on the first terminal yoke and the other of said ball and socket members having an attaching portion detachably engaging the other terminal yoke and held in place thereon by said detachable bearing members.

ADIEL Y. DODGE.